United States Patent [19]

Slack

[11] Patent Number: 5,739,207

[45] Date of Patent: Apr. 14, 1998

[54] HEXAMETHYLENE DIISOCYANATE RESIDUE-BASED COMPOSITIONS AS FILLERS FOR POLYISOCYANATES

[75] Inventor: William E. Slack, Moundsville, W. Va.

[73] Assignee: Bayer Corporation, Pittsburgh, Pa.

[21] Appl. No.: 777,317

[22] Filed: Dec. 27, 1996

[51] Int. Cl.$^6$ .............................. C08K 5/205; C08K 5/29; C08L 75/04; C08G 18/72

[52] U.S. Cl. .................. 524/728; 252/182.2; 524/196; 525/457; 528/49; 528/59; 528/76; 528/80; 528/85; 560/157; 560/158; 560/330; 560/355; 521/40.5; 521/49.5

[58] Field of Search ...................... 524/196, 728; 528/49, 59, 76, 80, 85; 252/182.2; 560/25, 26, 27, 330, 359, 157, 355, 158; 525/457; 521/40.5, 49.5

[56] References Cited

U.S. PATENT DOCUMENTS 4,507,464  3/1985  Rasshofer ................. 528/288

*Primary Examiner*—Rabon Sergent
*Attorney, Agent, or Firm*—Joseph C. Gil; Lyndanne M. Whalen

[57] ABSTRACT

Urethane-filled polyisocyanates are produced by (a) reacting a hexamethylene diisocyanate-containing residue having less than 10% by weight monomeric hexamethylene diisocyanate and a total NCO content of at least 25% with an alcohol containing at least one ether linkage in an equivalent ratio of isocyanate to hydroxyl groups of from about 0.9:1 to about 1.0:0.9 and (b) dissolving the product of (a) in a polyisocyanate. These urethane-filled polyisocyanates are particularly useful in the production of polyurethanes.

12 Claims, No Drawings

HEXAMETHYLENE DIISOCYANATE RESIDUE-BASED COMPOSITIONS AS FILLERS FOR POLYISOCYANATES

BACKGROUND OF THE INVENTION

The present invention relates to a hexamethylene diisocyanate ("HDI") residue-filled polyisocyanate, to a process for the production of a polyisocyanate filled with a HDI residue-based urethane, to polyurethane prepolymers produced from these urethane filled isocyanates and to polyurethanes produced from polyisocyanates filled with HDI residue-based urethanes.

HDI is generally produced by phosgenating hexamethylene diamine ("HDA"). In the course of producing HDI by this process, a non-distillable by-product which is commonly referred to as "HDI residue" or "HDI bottoms" is generated. One of the major concerns in the production of HDI is, therefore, the amount of HDI residue generated and whether such HDI residue is useful in other applications.

It would therefore be advantageous to develop a method for converting HDI residue to a urethane filler in which no HDI monomer remains. It would be particularly advantageous if this converted HDI residue could be dissolved in a polyisocyanate to produce a clear solution useful for the production of polyurethane products.

SUMMARY OF THE INVENTION

It is an object of the present invention to provide a polyisocyanate filled with a HDI residue-based urethane which is storage stable at ambient temperature.

It is also an object of the present invention to provide a method for producing a liquid HDI residue-based urethane filled polyisocyanate.

It is another object of the present invention to provide a liquid, clear, urethane-filled polyisocyanate which has been produced from HDI residue.

It is an additional object of this invention to provide a clear, liquid urethane-filled polyisocyanate prepolymer which has been produced from HDI residue.

It is a further object of the present invention to provide a process for producing polyurethanes, particularly polyurethane foams, from a liquid, clear, urethane-filled polyisocyanate that has been produced from HDI residue.

These and other objects which will be apparent to those skilled in the art are accomplished by reacting an HDI residue generated by phosgenation of HDA with a monofunctional alcohol and dissolving this reaction product in a polyisocyanate. The HDI residue to be used in the present invention contains less than 10% by weight monomeric HDI and has a total NCO content of at least 25% (i.e., the NCO content of monomeric HDI plus any other isocyanate group containing material). HDI residue satisfying these criteria and the alcohol are reacted in amounts such that the equivalent ratio of isocyanate groups to hydroxyl groups is from about 0.9:1 to about 1:0.9. Preferred alcohols are those containing at least one ether linkage, preferably from 1 to 18 ether linkages, most preferably from 2 to 8 ether linkages. The product of this reaction is a urethane group containing composition which is soluble in polyisocyanates, particularly in polymeric polymethylene polyphenyl polyisocyanate ("PMDI") at ambient temperature. This urethane group containing composition may be dissolved in a polyisocyanate such as PMDI to produce a urethane-filled polyisocyanate. This urethane-filled isocyanate may then be used to produce urethane filled polyisocyanate prepolymers and polyurethanes.

DETAILED DESCRIPTION OF THE INVENTION

The present invention relates to an HDI residue-based urethane filled polyisocyanate, to a process for producing such polyisocyanate, to a process for the production of a urethane-filled polyisocyanate prepolymer and to a process for the production of a polyurethane from such urethane-filled polyisocyanate. The urethane filled polyisocyanates of the present invention are made by reacting an alcohol, preferably an alcohol containing at least one ether linkage, more preferably from 1 to 18 ether linkages and most preferably from 2 to 8 ether linkages and an HDI residue satisfying specific criteria in amounts such that the equivalent ratio of isocyanate groups to hydroxyl groups is from about 0.9:1 to about 1:0.9, preferably about 1:1. This reaction product is then dissolved in a polyisocyanate to produce a urethane-filled polyisocyanate. This urethane-filled polyisocyanate may then be reacted with an isocyanate-reactive compound to produce polyisocyanate prepolymers and polyurethanes.

The HDI residue or mixture of HDI residue plus monomeric HDI useful in the practice of the present invention must satisfy the following criteria: (1) the residue must have been generated by the phosgenation of hexamethylene diamine; (2) the monomeric HDI content of the HDI residue must be less than 10% by weight; and (3) the total isocyanate group content of the monomeric HDI plus any other isocyanate group containing material must be at least 25%.

The phosgenation of HDA may be carried out by any of the methods known to those skilled in the art. Upon completion of that phosgenation, monomeric HDI is generally removed from the reaction mixture by distillation. In accordance with the present invention, the phosgenated mixture may be distilled until the monomeric HDI content has been reduced to less than 10%. The residue remaining contains less than 10% by weight monomeric HDI, preferably less than 5% weight monomeric HDI, and most preferably from about 1 to about 4% by weight monomeric HDI. This residue or any mixture containing such residue should also have a total NCO content (i.e., NCO content of monomeric HDI plus any other isocyanate group containing material) of at least 25%, preferably from about 25 to about 30%, if it is to be used as a starting material for the process of the present invention. It is preferred, but not required, that any solvent employed in the phosgenation process be removed prior to use of the HDI residue or HDI residue containing mixture in accordance with the present invention.

Any of the known alcohols containing ether linkages (i.e., compounds containing one or more alcoholic hydroxyl groups and at least one ether linkage) may be reacted with an HDI residue or HDI residue containing mixture satisfying the criteria of the present invention. Such alcohols generally have a molecular weight of from about 76 to about 1100, preferably from about 76 to about 400. Suitable alcohols may also contain groups such as chlorine, bromine, tertiary amine and other groups which are not reactive with respect to isocyanate groups. Mixtures of such alcohols may also be used.

Examples of suitable monofunctional alcohols containing at least one ether group include: diethylene glycol monobutylether, butoxy-propanol and 1-methoxy-2-propanol.

Alcohols which contain no ether groups, diols and polyols in combination with the monofunctional alcohol containing at least one ether group may also be reacted with the HDI residue in accordance with the present invention. These alcohols, diols and polyols containing no ether groups should not, however, be present in an amount such that the hydroxyl groups from these optional materials represent more than 40% of the total number of hydroxyl groups to reacted with the HDI.

Examples of alcohols having no ether groups which may optionally be used in the practice of the present invention include any of the isomers of butanol, pentanol and other known alcohols having an exclusively carbon backbone.

Diols useful in producing the urethane group containing HDI residue-based filler of the present invention typically have a hydroxyl functionality of from about 2 to 3. Specific examples of such diols include: ethylene glycol, 1,2- and 1,3-propylene glycol, 1,3- and 1,4-butylene glycol, 1,6-hexanediol, 1,8-octanediol, neopentyl glycol, cyclohexanedimethanol, 1,4-bis(hydroxymethyl) cyclohexane, 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol and polybutylene glycol.

Polyether polyols which may be reacted with HDI residue in accordance with the present invention typically have hydroxyl functionalities of from about 2 to about 6, preferably from about 2 to about 3, and molecular weights (number average determined by end group analysis) of from about 400 to about 6,000, preferably from about 500 to about 2,000 and from about 9 to about 130 ether linkages. Examples of such polyether polyols include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers obtained by addition of ethylene oxide and/or propylene oxide are most preferred. Suitable starting compounds containing reactive hydrogen atoms include polyhydric alcohols such as ethylene glycol, 1,2- and 1,3-propylene glycol, 1,3- and 1,4-butylene glycol, 1,6-hexanediol, 1,8-octanediol, neopentyl glycol, cyclohexanedimethanol, 1,4-bis(hydroxymethyl) cyclohexane, 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol and polybutylene glycol, glycerine and trimethyiolpropane; water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxyl phenyl)-ethane.

The HDI residue satisfying the criteria of the present invention, an alcohol containing at least one ether linkage and any optional polyol are reacted in amounts such that the equivalent ratio of isocyanate groups to hydroxyl groups is from about 0.9:1 to about 1:0.9, preferably about 1:1. This reaction may be carded out at temperatures of from about 30° to about 120° C., preferably from about 60° to about 90° C. at atmospheric pressure.

The reaction product is a urethane group containing HDI residue-based composition which is soluble in most of the commonly used organic solvents (e.g., toluene, methylene chloride and tetraahydrofuran) and in polyisocyanates, particularly polymeric polymethylene polyphenyl polyisocyanates, at ambient temperature. This reaction product may then be dissolved in a polyisocyanate to produce an HDI residue based urethane-filled polyisocyanate.

Polyisocyanates in which the urethane group containing HDI residue-based composition may be dissolved include: toluene diisocyanate (TDI), diphenylmethane diisocyanate (MDI) and polymeric polymethylene polyisocyanate (PMDI) containing at least 20% by weight diphenylmethane diisocyanate. Polymeric polymethylene polyphenyl polyisocyanates are particularly preferred.

The amount of polyisocyanate in which the urethane group containing HDI residue or HDI residue containing mixture is dissolved is generally determined on the basis of handling and processing considerations (e.g., viscosity). For most applications, however, the amount of polyisocyanate used is selected so that the dissolved urethane-group containing HDI residue will be present in the polyisocyanate in a quantity of from about 10 to about 50% by weight.

The urethane filled polyisocyanates of the present invention are characterized by their clarity and viscosities which are lower than the viscosities of polyisocyanates filled with other materials.

The urethane filled polyisocyanate of the present invention may be used to produce polyisocyanate prepolymers and/or polyurethanes by reacting them with any of the known isocyanate reactive materials. These filled polyisocyanates are preferably reacted with polyols having hydroxyl functionalities of from about 2 to about 4 and molecular weights (number average determined by end group analysis) of from about 400 to about 6,000 in amounts such that the NCO/OH ratio is from about 2 to about 10 to produce urethane-filled polyisocyanate prepolymers and in amounts such that the NCO/OH ratio is from about 0.8 to about 1.2 to produce polyurethanes.

The preferred isocyanate-reactive polyols include: propylene oxide, ethylene oxide, mixtures of ethylene oxide and propylene oxide and polyethylene/polypropylene extended diols and polyethers.

Low molecular weight isocyanate-reactive materials may also be used to produce urethane-filled polyisocyanate prepolymers and/or polyurethanes from the urethane filled polyisocyanates of the present invention. Suitable low molecular weight isocyanate-reactive compounds include polyhydric alcohols which have previously been described in the process for the preparation of polyether polyols. Dihydric alcohols are preferred.

Small amounts of monofunctional compounds generally known in polyurethane chemistry may be included in the reaction mixture from which polyurethanes are produced in accordance with the present invention.

Catalysts, blowing agents and solvents may be used to aid the polyurethane-forming reaction. Examples of catalysts useful for promoting urethane reactions include di-n-butyl tin dichloride, di-n-butyl tin diacetate, di-n-butyl tin dilaurate, triethylenediamine and bismuth nitrate. Examples of suitable blowing agents include: methylene chloride and carbon dioxide. Examples of the useful solvents include: toluene, tetrahydrofuran and chlorobenzene.

Having thus described our invention, the following Examples are given as being illustrative thereof. All parts and percentages given in these Examples are parts by weight and percentages by weight, unless otherwise indicated.

EXAMPLES

The materials used in the Examples which follow were:

| | |
|---|---|
| ALCOHOL A: | Diethylene glycol monobutyl ether. |
| ALCOHOL B: | 1-methoxy-2-propanol. |

-continued

| | |
|---|---|
| ALCOHOL C: | 1-butanol. |
| ALCOHOL D: | A 1-butanol-started propylene oxide adduct having a molecular weight of 315 and a functionality of 1. |
| ISOCYANATE A: | A polyisocyanate made up of 44% by weight methylene diphenyl diisocyanate (42% of the 4,4'-isomer and 2% of the 2,4'-isomer) and 56% by weight higher homologs of methylene diphenyl diisocyanate having an NCO content of 31.5%. |
| HDI RESIDUE: | Residue generated by phosgenating hexamethylene diamine which contains 3.5% monomeric HDI and has a total NCO content of 28.3%. |

The procedure used in each of the Examples was as follows:

HDI RESIDUE was introduced into a 1 liter 3-necked flask equipped with a stirrer and thermometer in the amount indicated in the Table. The HDI RESIDUE was stirred and to this stirred HDI RESIDUE was introduced the alcohol containing at least one ether linkage at 25° C. in the amount indicated in the Table. The resultant mixture was heated to 90° C. and then held at 90° C. until no NCO groups remained. The contents of the flask were then dissolved in the amount of ISOCYANATE A to obtain the % by weight capped residue which is reported in the Table.

TABLE

| Exam. | HDI Residue (gm) | Alcohol/ grams | % Urethane in Iso A | Appear. | NCO content (%) | Viscosity @ 25° C., mPa · s |
|---|---|---|---|---|---|---|
| 1 | 99.8 | A/109.1 | 26.7 | clear | 22.2 | 758 |
| 2 | 100 | B/60.6 | 20.0 | clear | 24.4 | 1194 |
| 3 | 118 | D/250 | 20.0 | clear | 25.2 | 538 |
| 4* | 72 | C/35.9 | 21.1 | turbid/ solids | — | — |
| 5* | 72 | C/35.9 | 15.8 | turbid/ solids | — | — |
| 6* | 72 | C/35.9 | 10.6 | turbid/ solids | — | — |
| 7* | 72 | C/35.9 | 5.3 | turbid/ solids | — | — |

*Comparative Example

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethane-filled, polyisocyanate comprising a) reacting 1) a hexamethylene diisocyanate residue from the phosgenation of hexamethylene diamine having less than 10% by weight monomeric hexamethylene diisocyanate or an isocyanate mixture containing such residue having a total isocyanate group content of at least 25% with 2) an alcohol containing at least one ether linkage in amounts such that the equivalent ratio of isocyanate groups in 1) to hydroxyl groups in 2) is from about 0.9:1.0 to about 1.0:0.9 and b) dissolving the product of a) in a polyisocyanate.

2. The process of claim 1 in which a hydroxyl compound that is different from alcohol 2) is selected from the group consisting of alcohols that do not contain an ether linkage, diols, polyethers and combinations thereof is also included in the reaction in an amount such that at least 60% of the total hydroxyl groups present are hydroxyl groups from the alcohol containing at least one ether linkage 2).

3. The process of claim 1 in which the alcohol having at least one ether linkage has a functionality of about 1 and a molecular weight of from about 76 to about 400.

4. The process of claim 1 in which the alcohol containing at least one ether linkage has a functionality of about 1 and a molecular weight of from about 400 to about 1100.

5. The process of claim 1 in which the hexamethylene diisocyanate residue or hexamethylene diisocyanate residue containing mixture has an isocyanate group content of at least 28%.

6. The process of claim 1 in which the hexamethylene diisocyanate residue is produced by phosgenation of hexamethylene diamine having an HDI monomer content of less than 5% by weight.

7. The process of claim 1 in which the polyisocyanate is a polymethylene polyphenyl polyisocyanate having an NCO content of from about 30 to about 33%.

8. The clear, urethane-filled polyisocyanate produced by the process of claim 1.

9. The clear, urethane-filled polyisocyanate produced by the process of claim 3.

10. The clear, urethane-filled polyisocyanate produced by the process of claim 4.

11. A urethane-filled polyisocyanate prepolymer produced by reacting the polyisocyanate of claim 8 with an isocyanate-reactive compound in an amount such that the NCO content of the resultant prepolymer is from about 3 to about 18%.

12. A polyurethane produced by reacting the urethane-filled polyisocyanate of claim 9 with an isocyanate-reactive compound in an amount such that the NCO/OH ratio is from about 0.8:1 to about 1.2:1.

* * * * *